United States Patent
Geyer

(10) Patent No.: US 12,445,206 B2
(45) Date of Patent: Oct. 14, 2025

(54) FLEXIBLE BAUD RATE

(71) Applicant: ACACIA TECHNOLOGY, INC., San Jose, CA (US)

(72) Inventor: Jonas Geyer, Somerville, MA (US)

(*) Notice: Subject to any disclaimer, the term of this patent is extended or adjusted under 35 U.S.C. 154(b) by 370 days.

(21) Appl. No.: 18/129,588

(22) Filed: Mar. 31, 2023

(65) Prior Publication Data

US 2024/0039639 A1 Feb. 1, 2024

Related U.S. Application Data

(63) Continuation of application No. 17/357,344, filed on Jun. 24, 2021, now Pat. No. 11,621,781, which is a continuation of application No. 16/544,282, filed on Aug. 19, 2019, now Pat. No. 11,265,084.

(60) Provisional application No. 62/782,790, filed on Dec. 20, 2018.

(51) Int. Cl.
*H04B 10/00* (2013.01)
*H04B 10/516* (2013.01)
*H04B 10/61* (2013.01)
*H04J 14/00* (2006.01)

(52) U.S. Cl.
CPC ....... *H04B 10/616* (2013.01); *H04B 10/5161* (2013.01); *H04B 10/612* (2013.01)

(58) Field of Classification Search
CPC .... H04B 10/50; H04B 10/516; H04B 10/548; H04B 10/556; H04B 10/5561
See application file for complete search history.

(56) References Cited

U.S. PATENT DOCUMENTS

| | | |
|---|---|---|
| 4,856,030 A | 8/1989 | Batzer et al. |
| 5,500,874 A | 3/1996 | Terrell |
| 5,838,744 A | 11/1998 | Zhang |
| 6,282,248 B1 | 8/2001 | Farrow et al. |
| 6,904,110 B2 | 6/2005 | Trans et al. |
| 7,746,969 B2 | 6/2010 | Bryan et al. |
| 8,981,908 B2 | 3/2015 | Sadr |
| 8,989,333 B2 | 3/2015 | Hashida et al. |
| 9,071,364 B1 | 6/2015 | Voois et al. |
| 9,178,683 B2 | 11/2015 | Varma et al. |
| 9,337,934 B1 | 5/2016 | Agazzi et al. |
| 9,515,767 B2 | 12/2016 | Frankel et al. |
| 9,735,881 B1 | 8/2017 | Agazzi et al. |
| 9,929,826 B2 | 3/2018 | Mitchell |
| 10,277,352 B2 | 4/2019 | Chedore |
| 10,476,588 B2 | 11/2019 | Gazzola |
| 2006/0079178 A1 | 4/2006 | Palin et al. |
| 2008/0089399 A1 | 4/2008 | Azenko et al. |
| 2008/0225175 A1 | 9/2008 | Shyshkin et al. |

(Continued)

FOREIGN PATENT DOCUMENTS

BR 102013012842 A2 3/2016

OTHER PUBLICATIONS

European Search Report for European Patent Application EP1919279. 2, mail date Mar. 12, 2020.

(Continued)

*Primary Examiner* — Daniel G Dobson
(74) *Attorney, Agent, or Firm* — Patterson + Sheridan, LLP

(57) ABSTRACT

A method, system, and apparatus enabled to selectively choose a baud rate for communication of optical data using a modem enabled to operate with an optical signal modulated at plurality of finely tuned baud rates.

20 Claims, 8 Drawing Sheets

PASSBAND USAGE AFTER CHANGE IN QAM FORMAT WITHOUT FLEXIBLE BAUD-RATE

(56) References Cited

U.S. PATENT DOCUMENTS

| | | |
|---|---|---|
| 2008/0260065 A1 | 10/2008 | Ojard |
| 2009/0196602 A1* | 8/2009 | Saunders ........... H04B 10/5055 398/9 |
| 2009/0262874 A1 | 10/2009 | Shen et al. |
| 2013/0094859 A1 | 4/2013 | Nielsen et al. |
| 2013/0330070 A1 | 12/2013 | Yu |
| 2015/0092898 A1 | 4/2015 | Lee et al. |
| 2016/0065303 A1 | 3/2016 | Shang et al. |
| 2016/0211939 A1 | 7/2016 | Yu et al. |
| 2017/0126314 A1 | 5/2017 | Prakash et al. |
| 2017/0214488 A1 | 7/2017 | Vassilieva et al. |
| 2017/0317759 A1 | 11/2017 | Agazzi et al. |
| 2017/0346591 A1 | 11/2017 | Chedore et al. |
| 2019/0245643 A1 | 8/2019 | Sun et al. |
| 2019/0319702 A1 | 10/2019 | Gazzola et al. |
| 2020/0044744 A1 | 2/2020 | Agazzi et al. |
| 2021/0075506 A1* | 3/2021 | Maeda ................... H04B 10/61 |

OTHER PUBLICATIONS

Zhou et al., Rate-adaptable optics for next generation long-haul transport networks, IEEE Communications Magazine (Mar. 2013), 51(3):41-49.

Buchali, Flexible Optical Transmission: M-QAM—Hybrid Formats—Probabilistic Shaping, Proceedings of SPIE (Jan. 2018), 10561:10561IS-1-10561US-10.

* cited by examiner

PASSBAND USAGE PRIOR TO CHANGE IN QAM FORMAT

PASSBAND USAGE AFTER CHANGE IN QAM FORMAT WITHOUT FLEXIBLE BAUD-RATE

PASSBAND AFTER CHANGE IN QAM FORMAT WITH FLEXIBLE BAUD-RATE

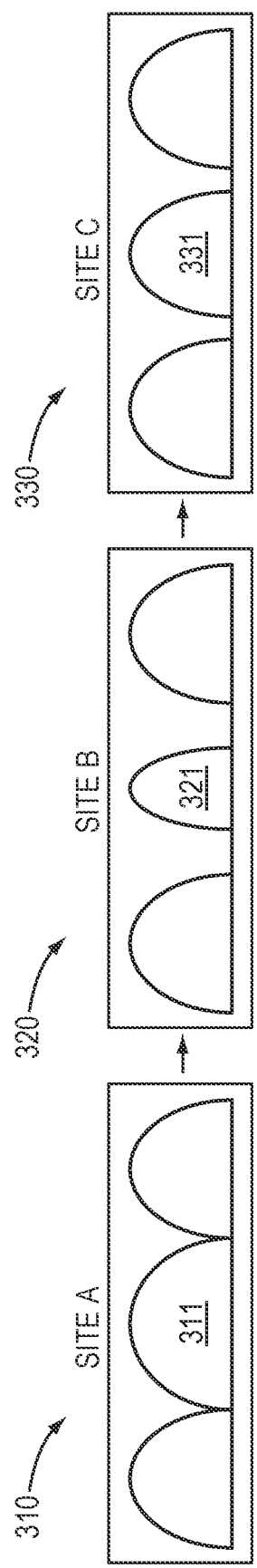
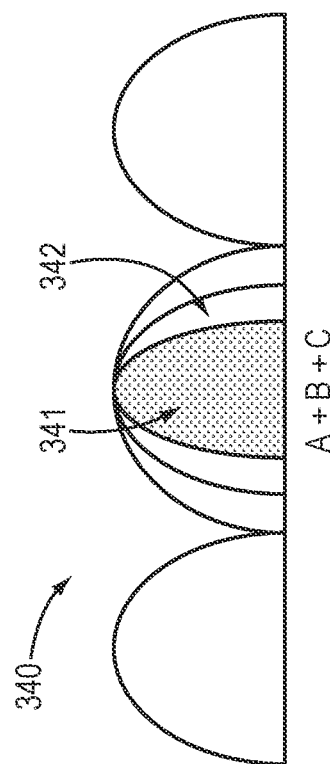
FIG. 3A
FIG. 3B

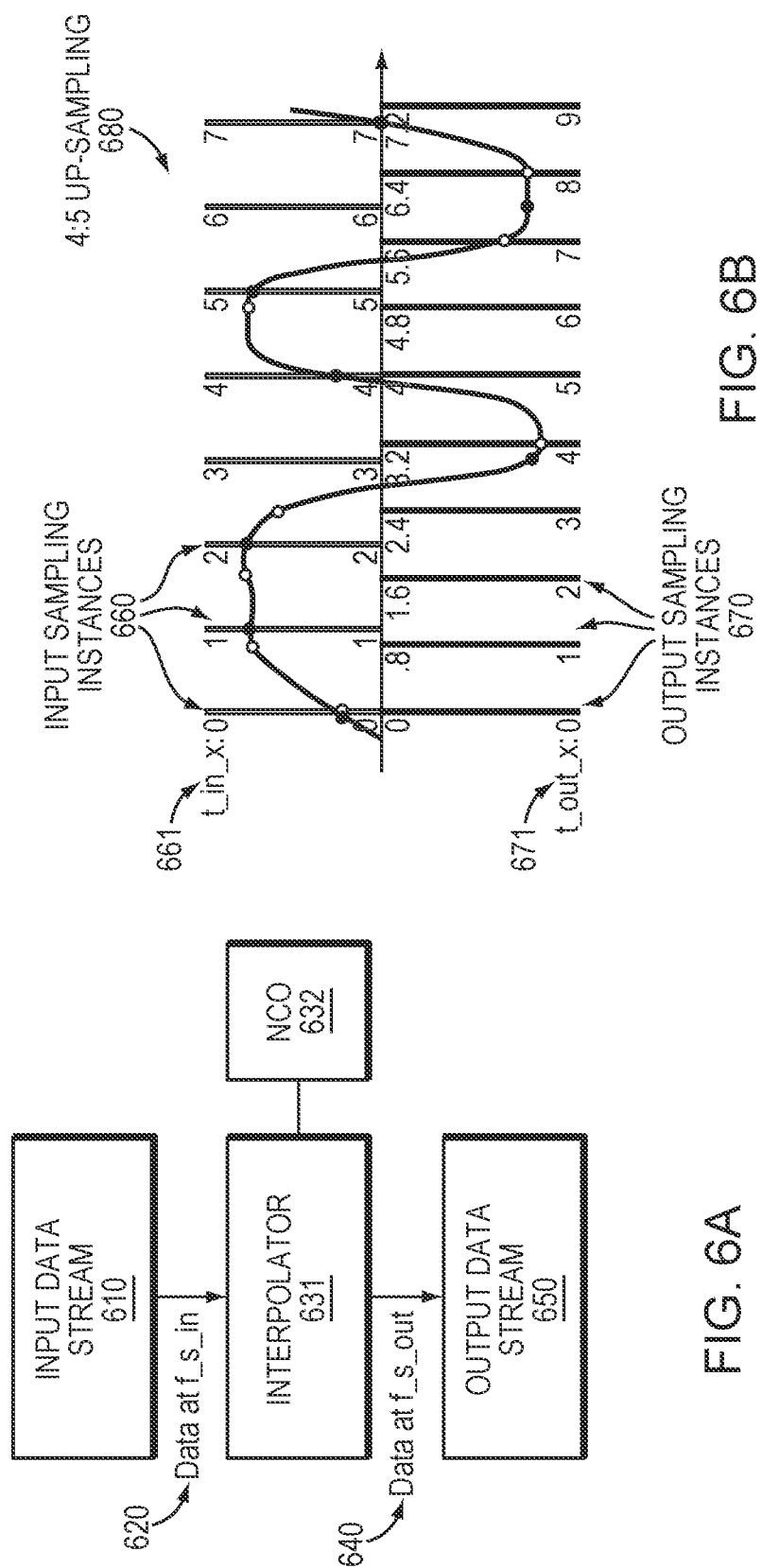

FLEXIBLE BAUD RATE

CROSS-REFERENCE TO RELATED APPLICATIONS

This application is a continuation application claiming priority under 35 U.S.C. § 120 to U.S. patent application Ser. No. 17/357,344 filed Jun. 24, 2021, titled "Flexible Baud Rate," now U.S. Pat. No. 11,621,781, issued Mar. 1, 2022, which is a continuation of U.S. patent application Ser. No. 16/544,282, filed Aug. 19, 2019, now U.S. Pat. No. 11,265,084 issued Mar. 1, 2022 titled "Flexible Baud Rate," which claims the benefit of U.S. Provisional Patent Application 62/782,790 filed Dec. 20, 2018, titled "Flexible Baud Rate," all of which are incorporated herein by reference in their entirety for all purposes.

BACKGROUND

Optical transmission of information over a fiber optic cable often encodes the information on a light wave from a laser.

BRIEF DESCRIPTION OF THE FIGURES

Various aspects and embodiments of the application will be described with reference to the following example embodiments. It should be appreciated that the figures are not necessarily drawn to scale.

FIG. 3a is a simplified illustration of an example of different passband availability of three example sites within the same optical transmission link, in accordance with an embodiment of the present disclosure;

FIG. 3b is a simplified illustration of maximizing usage of the available passband in an optical transmission link via altering the baud rate, in accordance with an embodiment of the present disclosure;

FIG. 6a is a simplified illustration of implementation of digitally processing data to adapt a fixed ADC or DAC sampling rate to a desired baud rate, in accordance with an embodiment of the present disclosure;

FIG. 6b is a simplified illustration of an example of recording and calculating input and output sampling distances for 4:5 ratio up-sampling, in accordance with an embodiment of the present disclosure;

SUMMARY

Figure 1:
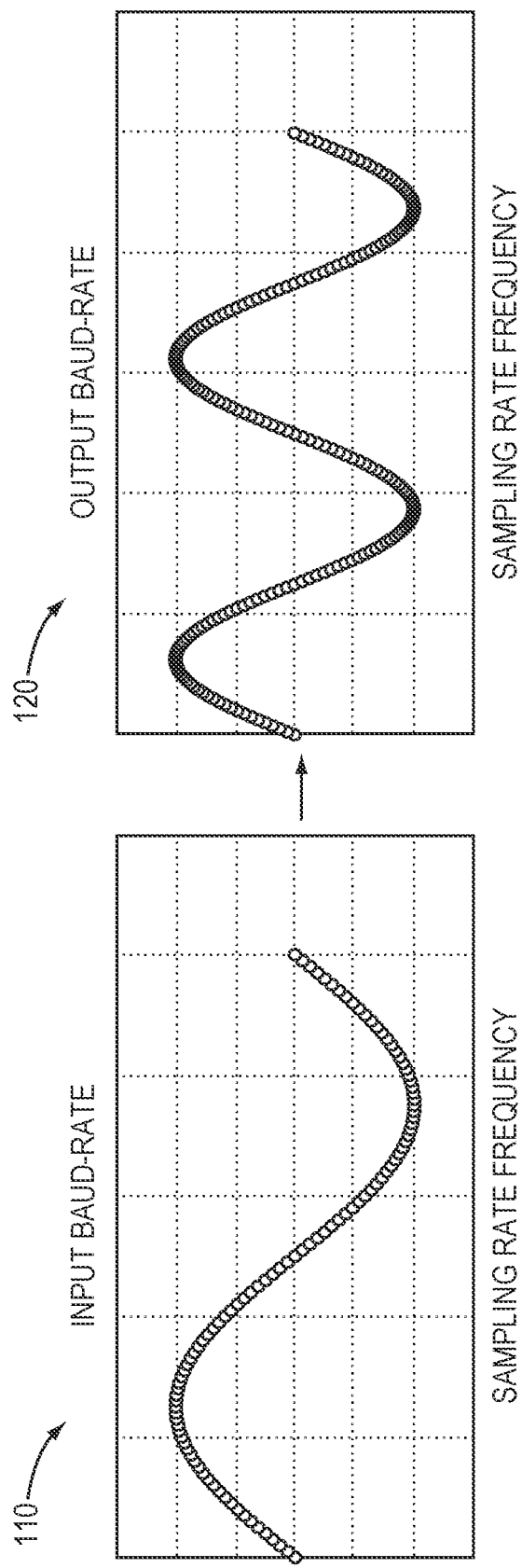
FIG. 1 is a simplified illustration of two sine waves symbolizing an input sampling rate and a target output sample rate, in accordance with an embodiment of the present disclosure.

A method, system, and apparatus enabled to selectively choose a baud rate for communication of optical data using a modem enabled to operate with an optical signal modulated at plurality of finely tuned baud rates.

DETAILED DESCRIPTION

Historically optical coherent transceivers operate at a fixed baud-rate, or a small, fixed set of baud-rates. In many embodiments, Applicants have realized that in a communication with a fixed type of QAM encoding, there may be no reason to change a baud rate of the system. In most embodiments, with fixed QAM encoding, changing a baud rate may change information sent over the link, essentially breaking the amount of data that a receiver expects based on the QAM encoding format. In some embodiments, the current disclosure has realized it may be beneficial to be able to operate at different QAM modulation formats. In embodiments of a communication system that operates with different types of QAM encoding, the current disclosure recognized that it would be beneficial to change a baud rate to accommodate a different data rate of a QAM encoding format.

In most embodiments, modulation may involve both amplitude and phase of the transmission carrier with common modulation formats including BPSK, QPSK, 8-QAM, 16-QAM, 32-QAM, 64 QAM, 128 QAM, other $2^N$ QAM modulations, and other X QAM, where X is the modulation order and may be any integer value. In further embodiments, modulation formats with non-integer modulation orders may be reached by combining different integer based QAM modulations at different ratios. In still further embodiments, other formats such as probabilistic constellation shaping may enable other non-integer modulation formats. In most embodiments, the amount of data able to be encoded by different baud rates may be different. In some embodiments, bits corresponding to 0 and 1 may be encoded on a BPSK format. In other embodiments, bits corresponding to 00, 010, 10, and 11 may be encoded on QPSK. In many embodiments, bits corresponding to 000-111 may be encoded on an 8-QAM format. In almost all embodiments, the amount of data able to be transmitted over a particular QAM rate may change with the encoding format of the QAM rate.

In certain embodiments, the current disclosure may enable optical transceivers to have flexible or changeable baud rates. In many embodiments, the current disclosure may enable the tune-ability of the baud rate with very fine granularity over a wide range. In particular embodiments, the current disclosure may enable an adjusting of a Baud rate from 24.0 to 72.0 GBd in fine steps. In many embodiments, the ability to adjust a baud rate may enable optimization of a modulation format to given conditions of a transmission link.

Typically, optical transmission links have, for example, a band-pass filtering characteristic, which means that large baud-rate signals suffer filtering penalty. A traditional coherent transceiver may therefore not be able to operate at all on such a link, if the baud-rate is too large for the given filtering characteristic. Conventionally, it may be able to switch instead to a possibly much lower baud-rate (of the small set of available baud rates) to overcome this issue. Generally, switching to a lower baud rate comes at the cost of reduced performance because a signal with smaller baud-rate can generally carry less information than a signal with large baud-rate. Conventionally, this may mean reduced transmission data rate if the modulation format used is not changed, or degraded transmission performance (OSNR sensitivity) if the modulation order is increased to keep the data rate the same. In most embodiments, the current disclosure has realized that a coherent transceiver with finely adjustable baud rate may be able fully utilize the available bandwidth. In some embodiments, flexible-QAM optical transmission links may have flexibility regarding the order of QAM by which data is transmitted. In those embodiments, a transceiver with a flexible baud rate may be able to improve functionality of flexible-QAM optical transmission links. In most embodiments, a transceiver with flexible baud-rate may be able to achieve a maximum possible data-rate.

In certain embodiments, fine adjustment of baud-rate may mean that the baud rate can be adjusted in steps. In some embodiments, fine adjustment of baud rates may refer to a certain granularity with which the baud-rate can be adjusted. In most embodiments, slight baud-rate fluctuations may consist of fluctuations of 1% of the overall baud rate or less. In some embodiments, fine adjustment of baud rates may refer to adjustment of baud rates of less than 3%, 2%, 1%, 0.5%, 0.3%, or 0.1% of the overall baud rate. In other embodiments, fine adjustment of a baud rate may mean increasing the baud rate in increments of about 1% of the overall baud rate. In a particular embodiments, an implementation may use baud-rates $B\_0, B\_1, B\_2, \ldots$ where baud-rate step size ratio (Delta_B_ratio) may defined as the relative increase of baud-rate from one baud-rate to the next: Delta_B_ratio=$B\_1/B\_0$. In certain embodiments, fine adjustment or tuning may mean that a baud-rate step size ratio Delta_B_ratio is equal or smaller than 30%, 20%, 10%, 5%, 3%, or 1%. In some embodiments, wide adjustment of a baud-rate may mean the baud rate can be adjusted from a smallest baud-rate B_min to a largest baud-rate B_max. In most embodiments, wide may mean that a ratio of B_max/B_min is greater than 1.5. In other embodiments, wide may mean a ratio of B_max/B_min is greater than 2.0. In other embodiments, wide may mean a ratio of B_max/B_min is greater than 2.5. In many embodiments, using a flexible Baud Rate, a network operator may be able to adjust a transmission spectrum to better fit into the aggregate available passband of the channel by having the ability to continuously tune the baud rate, filling in margin gaps. In most embodiments, a target baud rate may be different from a current baud rate. In almost all embodiments, the efficiency of the transmission spectrum's fit into the aggregate available passband of the channel may be referred to as "passband utilization."

In many embodiments, a fine tuning and/or flexible baud rate may be useful in a multi-haul network with multiple ROADM (reconfigurable optical add-drop multiplexer) nodes. In many embodiments, channel passband widths may vary among links in the same network as well as between networks. In certain embodiments, spectral margin gaps may account for worst-case cascaded passband conditions may result in stranded bandwidth. In most embodiments, by using flexible Baud Rate, these margin gaps may be able to be reduced to improve spectral utilization of the channel.

In many embodiments, with a flexible Baud Rate, rather than adjusting a line system to match an optical transmission, an optical transmission may closely match the line system, giving rise to a new level of network utilization. In most embodiments, a flexible grid channel spacing in a network may create bandwidth fragmentation as a result of spectral margin gaps across a network. In certain embodiments, bandwidth fragmentation may be minimized using flexible Baud Rate, thus minimizing stranded bandwidth.

In some embodiments, the disclosure may enable an architecture of an optical coherent transceiver that can adjust the baud-rate. In most embodiments, it may be possible to adjust the baud rate physically or digitally. In some embodiments, baud-rate adjustability at both transmitter (Tx) and Receiver (Rx) side may be achieved by adjusting a sample-rate of a DAC or ADC. In some embodiments, a baud-rate and a sampling-rate may be equivalent. In other embodiments, baud-rate adjustability at a transmitter and a receiver may be achieved by digitally processing the data entering a DAC or leaving an ADC in order to adapt from a fixed DAC or ADC sampling rate to a desired baud-rate.

In some embodiments, adjusting a sampling rate of an ADC or DAC in a coherent modem may be power efficient. In other embodiments, a microprocessor may measure the difference between an incoming baud rate and outgoing sample rate and calculate and implement a change in a ADC's or DAC's sample rate to a desired baud rate. In certain embodiments, a phase locked loop (PLL) in either the DAC/ADC itself or as part of the reference clock circuit may ensure that a DAC or ADC sample-rate may be at a known exact ratio (often times 2.0×, 1.5×, 1.25× or 1.0×) to the baud-rate. In many embodiments, a DSP may consume samples at a ratio specified for a DAC or ADC.

In many embodiments, adjusting a sample rate of a DAC or ADC may be difficult as these analog components (ADC, DAC, phased locked loop (PLL), reference clock) need to be designed and tested to cover a potentially large range of rates. In some embodiments, an integer PLL may require that an incoming and outgoing clock has an integer ratio. In some embodiments, a fractional PLL may not have a requirement for n integer. In some embodiments, a modulate may have a low-rate reference clock at a fixed frequency and a PLL circuit may be used with a tunable oscillator to create a high frequency clock to drive an ADC or DAC. In other embodiments, if a baud-rate of the transceiver needs to be adjusted slightly to track small changes of the rate of the transmitted data-stream, then such an adjustment may need to be made in the analog domain by changing the DAC (or ADC) sample-rate via adjustment in the PLL or via adjustment of the reference clock rate.

For example, in a first embodiment, if a baud-rate is 31 GBd then the DSP may provide the Tx samples at 62 GSamples/sec (exactly two samples for each symbol). In this first embodiment, these samples at 62 GSamples/sec are provided to the DAC which runs at that sample-rate, converting the digital samples to an electrical waveform. In a second embodiment, to operate at 42 GBaud then a DSP provides data with a sample-rate of 84 GSamples/sec to a DAC that needs to run now at 84 GSamples/sec as well.

In some embodiments, adjusting a sample rate of a DAC or ADC may mean that the analog bandwidth is too large, causing a penalty from image spectra that are not properly suppressed (i.e. aliasing and crosstalk into neighboring channels). In many embodiments, a combination of optical receiver (including photo detectors and TIA) and ADC may have a certain bandwidth that is characteristic for a given receiver. In some embodiments, for a given bandwidth, independent of the ADC sampling rate, may limit how much that ADC sampling rate can be reduced. In some embodiments, if an ADC and optical components have a large bandwidth, adjusting a sample-rate may not affect the bandwidth and lowering the sample-rate without suffering from a penalty due to an effect called aliasing. In other embodiments, if an ADC runs at full rate and a sample rate is adjusted digitally, then aliasing may be prevented. In certain embodiments, a too low sampling rate may mean that signal, or noise components at high frequencies (outside the range of the signal to be demodulated) may alias into a signal of interest and therefore cause degrading the performance of the receiver. In other embodiments, at a transmit side there may be an effective bandwidth of DAC and the following electrical RF and optical components. In many embodiments, if an effective bandwidth is independent of the DAC sample-rate then that may limit the range in which the sample rate can be adjusted. In many embodiments, if a sample rate is too low then a resulting optical spectrum will have partial mirror images of the main signal at frequencies that may interfere with neighboring channels in an optical WDM transmission scenario.

In some embodiments, digitally processing the data entering a DAC or leaving an ADC in order to adapt from a fixed DAC or ADC sampling rate to a desired baud-rate may eliminate disadvantages associated with adjusting a sample-rate of a DAC or ADC allowing a very simple analog architecture (single reference clock that can also be shared by ADC and DAC, single sample rate). In some further embodiments, a DSP may be able to adjust the sample rate to a desired output baud rate. In many embodiments, an interpolator, controlled by a NCO (numerically-controlled oscillator), resamples the input data to match the target sample output rate. The term accommodate one rate to another rate may mean in the context of this application having matched rates.

In certain embodiments, digitally processing data entering a DAC or leaving an ADC may consume more power than adjusting a sampling rate as additional power consumption may be needed for a DSP necessary to convert from baud-rate synchronous sample-rate to ADC/DAC sample-rate.

In many embodiments, implementation at the Tx side may include some DSP blocks creating samples at an integer multiple of the baud-rate. In an example embodiment, the DSP blocks create samples at a 4× multiple of the baud rate. In this embodiment, these samples enter an interpolator block which re-samples the data controlled by an NCO to an outgoing sample rate that is the sample-rate of the DAC. The incoming samples are spaced at time T, so the first sample corresponds to time $t\_in\_0=0$ T, then the next sample is at time $t\_in\_1=1$ T; $t\_in\_2=2$ T, etc. The NCO calculates the times $t\_out$ n at which out samples need to get calculated by the interpolator block. If it is required to change the sampling rate from 4× to 2× (which is a trivial case) then those times would be $t\_out\ 0=0T$, $tout\ 1=2$ T, $t\_out\ 2=4$ T, . . . . In that case for every N input samples the block would create N/2 output samples, changing the sample rate from $f\_s\_in$ to $f\_s\_out$, where $f\_s\_out=f\_dac$. This example embodiment illustrates a case where a re-sampling converts from 4× $f\_baud$ to 5× $f\_baud$, in which case N input samples result in 5/4*N output samples. In this embodiment, it can be seen that many output samples, e.g. $t\_out\ 1=0.8$ T are in between two of the input samples. In this embodiment, the interpolator needs to calculate the amplitude of the output sample by taking several input samples in the vicinity of $t\_out\_x$ into account.

In some embodiments, the ratio between input and output sample-rate may usually be an irrational number (that also may change slightly over time), so $t\_out\_x$ could be 6.023 T, which means the interpolator needs to produce a sample that is between the input samples at $t\_in\_6=6$ T and $t\_in\_7=7$ T.

In certain embodiments, a number of output samples created in each processing step may usually fluctuate. In many embodiments, fluctuation of output samples may occur even if the number of input samples per step is constant dependent on the re-sampling ratio used. In most embodiments, in a FIFO (first-in-first-out) buffer (e.g. made of RAM or flip-flops) may be needed to absorb burstiness of the data-stream in order to provide a steady sample stream to the DAC.

In many embodiments, at an Rx side, data from the ADC at ADC sample-rate $f\_adc$ enters an interpolator DSP block. That interpolator is again controlled by an NCO to re-sample the data to a sample-rate $f\_s\_out=2×\ f\_baud$ (in this example). The resampled data can then get processed by other demodulator DSP blocks. This allows to receive signals at a wide range of baud-rates while using an ADC that runs at a fixed sample-rate $f\_ADC$. The interpolator and NCO can be reconfigured to change the sample-rate of the ADC signals to the sample-rate required by the other demodulator blocks (for example a de-mapper and bit-slicer). These blocks usually require the data to be sampled at exactly 1 or 2 samples per symbol, or another rate that has a fixed relationship to the baud rate.

The NCO has a control input in both example embodiments which can be used to finely adjust or modulate the resampling ratio. In these example embodiments, this can be useful to track small variations in the ratio between baud-rate and DAC/ADC sample-rate. Such variations may be common in practice due to causes such as phase noise of the involved oscillators. In these example embodiments, such adjustment can be done by altering the re-sampling ratio. In these example embodiments, as in the example above: if the re-sampling ratio is 4:5, then N input samples create 5/4*N output samples. In these example embodiments, if instead more output samples are needed (i.e. the sampling rate at the output should be increased) then the resampling ratio can be changed to e.g. 4:5.1 to create 5.1/4*N output samples for each N input samples.

Refer now to the example embodiment of FIG. 1. FIG. 1 shows first sample baud rate 110 and desired second baud rate 120. The example embodiment of FIG. 1 illustrates the change in baud rate that may benefit an optical transmission link following a change in modulation format, e.g. from 16-QAM to 8-QAM while keeping the data rate unchanged. In further example embodiments, such a change may allow for usability of greater baud-rates. In the example embodiment of FIG. 1, this change from baud-rate 110 to frequency 120 demonstrates an adaptation to a higher baud-rate.

Figure 2A:
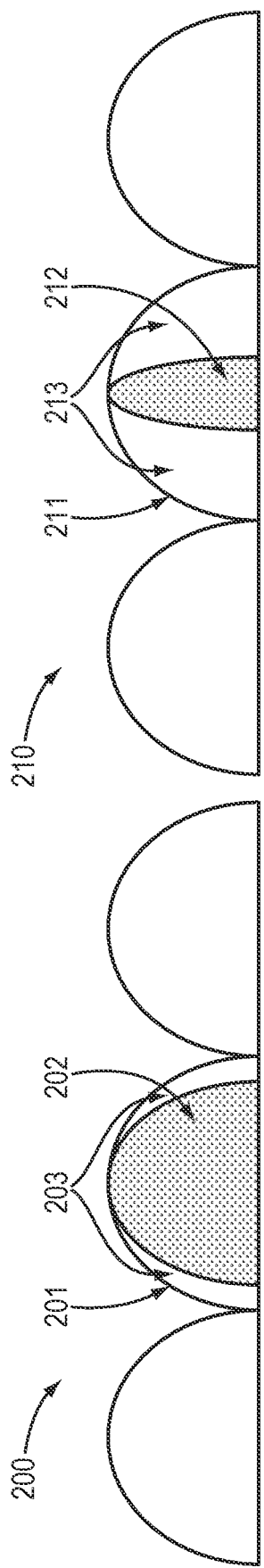
FIG. 2a is a simplified illustration of passband usage prior to a change in QAM format, in accordance with an embodiment of the present disclosure.
Figure 2B:
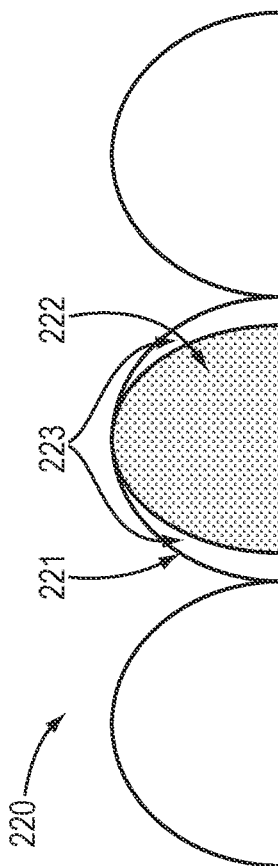
FIG. 2b is a simplified illustration of passband usage in non-flexible baud-rate system following a change in QAM format, in accordance with an embodiment of the present disclosure.
Figure 2C:
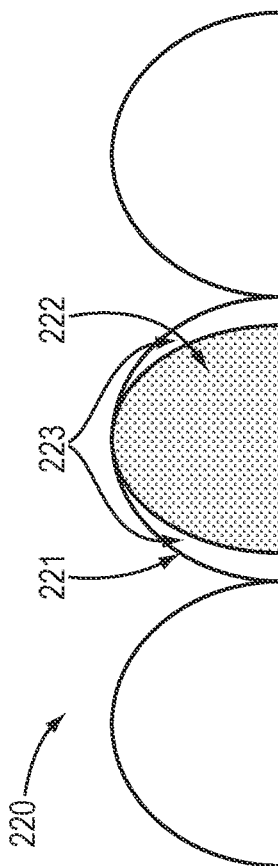
FIG. 2c is a simplified illustration of passband usage in a flexible baud-rate system following a change in QAM format, in accordance with an embodiment of the present disclosure.

Refer now to the example embodiment of FIGS. 2a-2c. In the example embodiment of FIG. 2a, graph 200 generally illustrates available passband, such as given by passband 201, and used passband, such as given by used passband 202. Unused passband 203 illustrates the unused portion of the passband by the transmission system, and its relatively small size as compared with used passband 202. In the example embodiment of FIG. 2b, graph 210 generally illustrates available passband, such as is given by available passband 211, following an increase in the order of QAM used by an optical transmission system without a corresponding change in baud-rate. Used passband 212 shows the amount of passband used of available passband 211. FIG. 2b shows, for example, the occurrence of unused passband 213 of an optical transmission link after a change in QAM modulation formats without a corresponding change in baud-rate. In this example embodiment, used passband 212 is what is used in available passband 211 after a change in the baud rate, and, in this embodiment, unused passband 213 is much greater as a portion of total passband 211 as compared to unused passband 203 as a portion of total passband 201 in graph 200. Refer now to the example embodiment of FIG. 2c. Graph 220 generally illustrates the amount of available passband in an optical transmission link with flexible baud-rate, as shown in available passband 221. Passband usage 222 illustrates the usage of the available passband and unused passband 223 illustrates the unused passband. In FIG. 2c, the unused passband 223 has been decreased, as compared to FIG. 2b, by increasing the baud rate of the link. In FIG. 2c, flexible baud-rate capability allows for higher efficiency in a flexible-QAM optical transmission link following a change in modulation order. In many embodiments, if a change of QAM did not occur or was not able to occur, then there may be no need to change a baud rate as there may be no or little unused passband.

Refer now to the example embodiments of FIGS. 3a and 3b. FIGS. 3a and 3b illustrate examples of benefits that a baud-rate flexible system may provide. In the example embodiment of FIG. 3a, three different sites along a single optical transmission link are illustrated: Site A 310, Site B 320, and Site C 330. In this example embodiment, each site has available passbands 311, 321, and 331 of varying widths. The example embodiment of FIG. 3b illustrates generally usage of flexible baud-rate capability, such as passband usage 341, in optical transmission link 340 of FIG. 3b. In this example embodiment, the baud-rate has been altered to meet the smallest available passband, Site B's available passband 321, to ensure data is transmitted at the highest possible baud-rate without exceeding the available baud-rate at any of sites 310, 320, and 330. In other embodiments, usage of a baud-rate that exceeds the available passband may bar transmission at that link, while usage of a baud-rate that does not meet the available passband reduces efficiency.

Figure 4B:
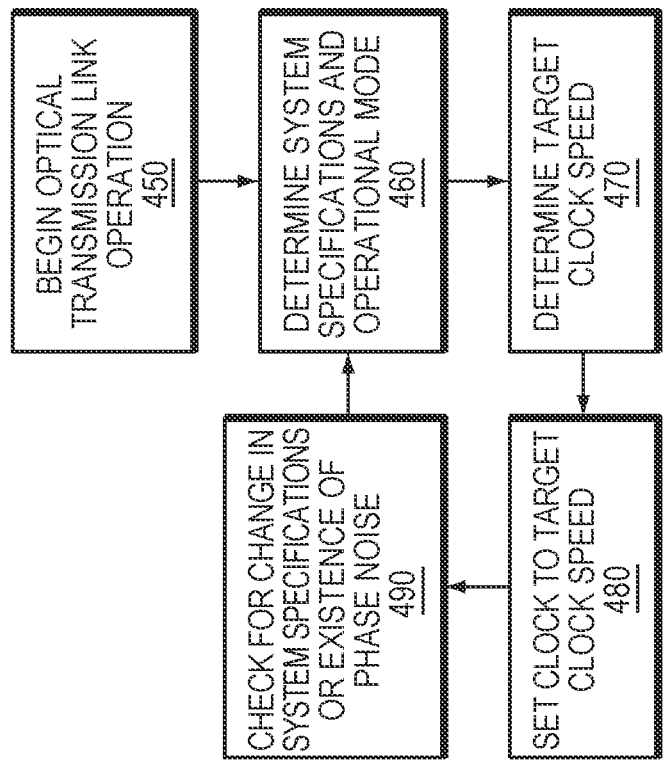
FIG. 4b is a simplified illustration of a method for adjusting a clock speed, in accordance with an embodiment of the present disclosure.
Figure 4A:
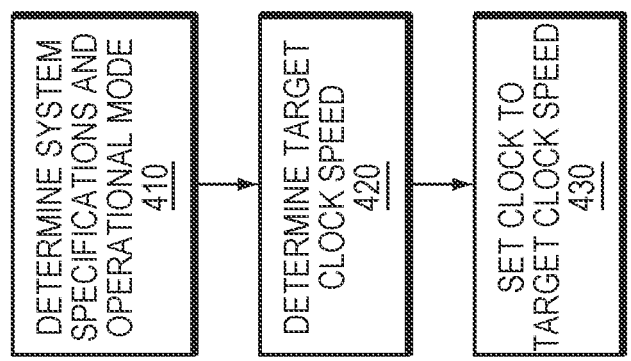
FIG. 4a is a simplified illustration of a method for adjusting a sample-rate of an ADC or DAC to change a baud-rate, in accordance with an embodiment of the present disclosure.
Figure 5:
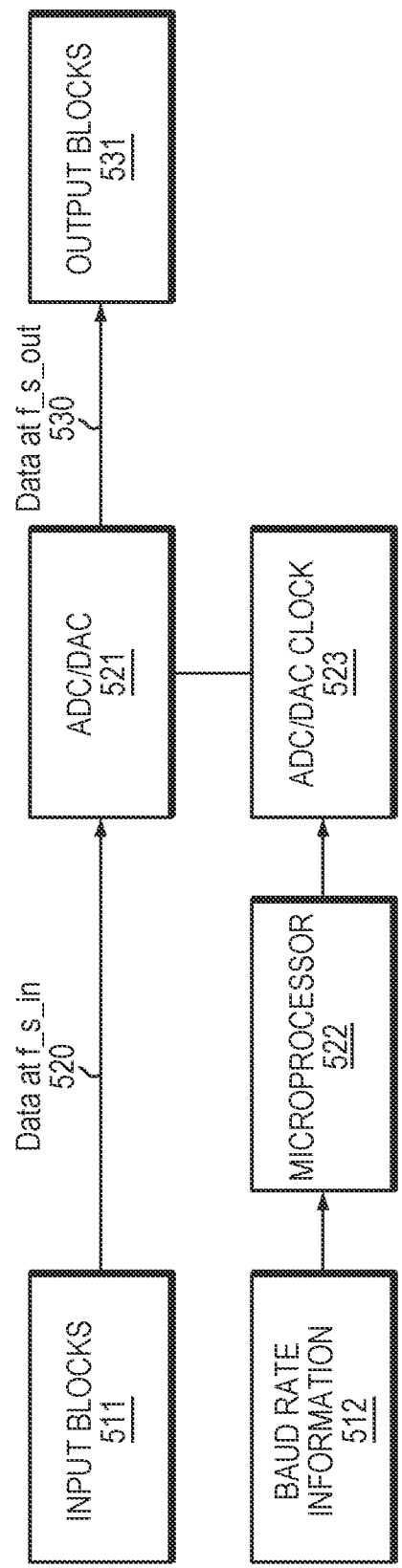
FIG. 5 is a simplified illustration of adjusting a sample-rate of an ADC or DAC to achieve baud-rate adjustability, in accordance with an embodiment of the present disclosure.

Refer now to FIGS. 4a and 5. FIG. 4a shows an example method by which one may utilize an ADC or DAC with adaptive baud-rate capabilities to alter a clock speed to best optimize an output baud-rate fit the available passband of an optical link, as used passband 341 in the example embodiment FIG. 3b. FIG. 5 illustrates an example system that may be used to implement the method of FIG. 4a with an ADC or DAC. In this example embodiment, baud-rate information 512 is read by the microprocessor 522, which determines the example embodiment's system specifications and operational modes (step 410). From the baud information, microprocessor 522 determines a target clock speed to allow for more efficient data transfer (step 420). Microprocessor 522 adjusts the clock 523 of ADC or DAC 521 to meet the target clock speed (step 430). ADC or DAC 521 outputs data at sample-rate 530, which may be different from sample-rate 520. In these example embodiments, efficiency of an optical transmission link may be improved, similar to the example embodiments of FIGS. 3a and 3b.

Refer now to the example embodiment of FIG. 4b. In many embodiments, an example process, such as for example the one of FIG. 4a, may occur at the beginning of usage of an optical transmission link, as the system's specifications may not change. In other embodiments, a method, such as one of FIG. 4b, may be performed several times iteratively in a system that is subject to changing specifications or passband availability (step 490). In those embodiments, baud-rate information 512 may be a steady stream of system specifications or passband availability, rather than a one-time input.

Refer now to the example embodiments of FIGS. 6a and 6b. FIG. 6a is an example embodiment of a generalized system in which data may be digitally sampled. In this example embodiment, incoming data stream 610 at specific baud-rate 620 is digitally altered via interpolator 631 to change the baud rate to output baud-rate 640. FIG. 6b is an example embodiment of the calculation of output target sampling distances as compared with input sampling distances at the example input sampling rate versus output sampling rate ratio 680 (up-sampling or down-sampling ratio, if increasing or decreasing the baud rate) of 4:5. In the example embodiment of FIG. 6b, each "X" symbolizes a second counter on the input rate or output rate, demonstrating how calculation of the sampling instances is calculated and implemented. In this example embodiment, each "second" on rate 671 constitutes 0.8 seconds on rate 661, due to the up-sampling ratio of 4:5. The example calculation process of FIG. 6b occurs at FIG. 6a's NCO 632 and is implemented via interpolator 631.

Figures 7A, 7B:
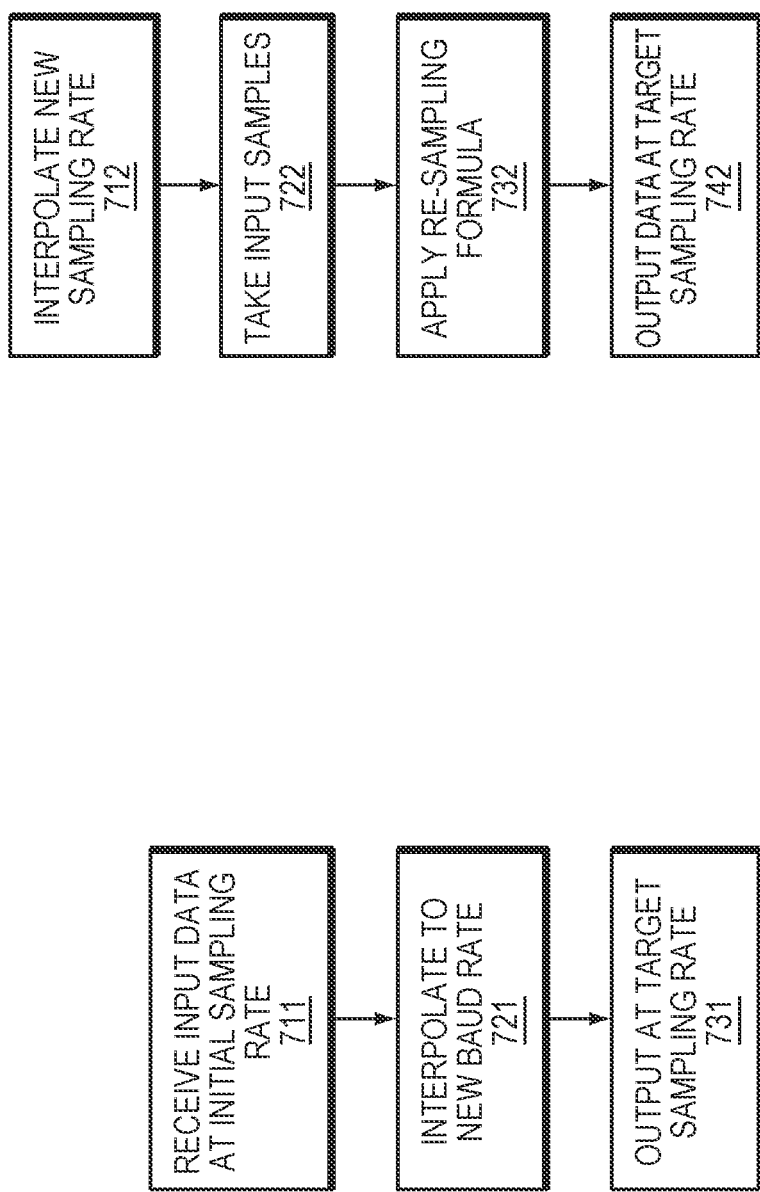
FIG. 7a is a simplified illustration of a method for alteration of the sampling rate of a data stream by digitally processing the input data, in accordance with an embodiment of the present disclosure.
FIG. 7b is a simplified illustration of a method for calculation and implementation of changes to the output sample rate of a DAC or ADC by digitally processing the input data, in accordance with an embodiment of the present disclosure.
Figure 8A:
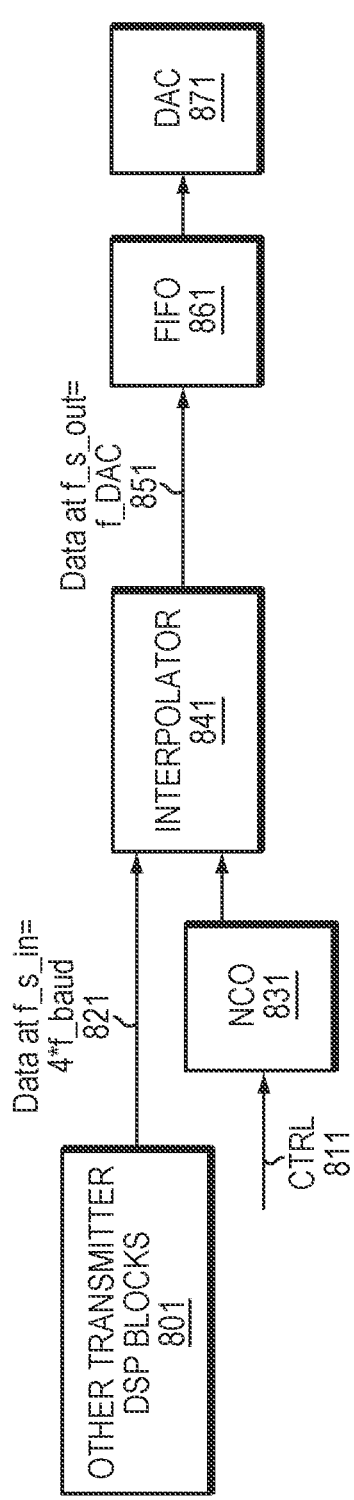
FIG. 8a is a simplified illustration of digitally processing data at the transmit side of an optical transmission link, in accordance with an embodiment of the present disclosure.
Figure 8B:
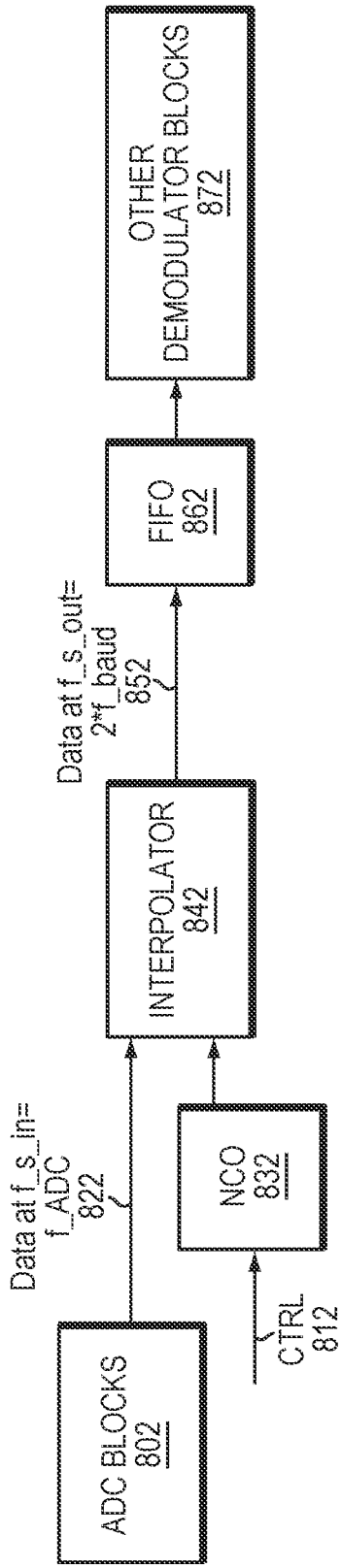
FIG. 8b is a simplified illustration of digitally processing data at the receiver side of an optical link, in accordance with an embodiment of the present disclosure.

Refer now to the example embodiments of FIGS. 7a, 7b, 8a, and 8b. FIG. 7a demonstrates an example embodiment of a three-step process by which a data sampling rate may be digitally altered given an already-calculated up-sampling or down-sampling ratio. In this example embodiment, FIG. 6a's input data stream 610 and baud-rate 620 are sent to interpolator 631 (step 711). FIG. 6a's interpolator 631 interpolates the data to a new baud rate (step 721), and output data stream 650 is output at baud-rate 640 (step 731). FIG. 7b illustrates an example embodiment of a method by which a calculated target sampling rate is implemented in an ADC or DAC system to account for system phase noise and the resulting fluctuation in baud-rate or passband availability that occurs. In this example embodiment, data output following calculation of the desired sampling ratio is output at the target rate (step 712). Multiple input samples are taken over time to detect potential system fluctuations due to phase noise (step 722). In this example embodiment, if necessary to increase efficiency, a re-sampling formula is applied to adjust the output sampling rate (step 732), resulting in a differing, and potentially more efficient, output rate (step 742). FIGS. 8a and 8b are example embodiments of systems in which sampling rates may be altered for a DAC or ADC system, respectfully. In these example embodiments, NCO 831 or 832 initially calculates target sampling rate 851 or 852 (step 712). In many example embodiments, interpolator 841 or 842 takes input samples 801 or 802 (step 722) and implements a re-sampling formula obtained from NCO 831 or 832 (step 732). Data is output at target sampling rate 851 or 852 that is different from input rate 821 or 822, respectively (step 742). The example embodiments of FIGS. 8a and 8*b* show potential differences in ADC and DAC systems utilizing digital alteration of sampling rates that may occur.

In one or more of the embodiments described herein may be stored on a computer readable medium. In certain embodiments, a computer readable medium may be one or more memories, one or more hard drives, one or more flash drives, one or more compact disk drives, or any other type of computer readable medium. In certain embodiments, one or more of the embodiments described herein may be embodied in a computer program product that may enable a processor to execute the embodiments. In many embodiments, one or more of the embodiments described herein may be executed on at least a portion of a processor.

In most embodiments, a processor may be a physical or virtual processor. In other embodiments, a virtual processor may be spread across one or more portions of one or more physical processors. In certain embodiments, one or more of the embodiments described herein may be embodied in hardware such as a Digital Signal Processor DSP. In certain embodiments, one or more of the embodiments herein may be executed on a DSP. One or more of the embodiments herein may be programed into a DSP. In some embodiments, a DSP may have one or more processors and one or more memories. In certain embodiments, a DSP may have one or more computer readable storages. In many embodiments, a DSP may be a custom designed ASIC chip. In other embodiments, one or more of the embodiments stored on a computer readable medium may be loaded into a processor and executed.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

Although the present invention is defined in the attached claims, it should be understood that the present invention can also (alternatively) be defined in accordance with the following embodiments:

1. A method for a adjusting a baud rate comprising:
   digitally altering a sample rate of a digital to analog converter to change baud rate of the system.
2. A method for a adjusting a baud rate comprising:
   digitally altering a sample rate of an analog to digital converter to change baud rate of the system.
3. A method for finely adjusting baud-rate of a coherent transceiver over a wide adjustment range.
4. A coherent transceiver architecture that allows fine adjusting of baud-rate over a wide adjustment range.
5. The coherent transceiver architecture of embodiment 4 wherein fine means that the baud rate is enabled to be adjusted from a smallest baud-rate B_min to a largest baud-rate B_max; wherein the ratio of B_max/B_min is greater than 1.5.
6. The coherent transceiver architecture of embodiment 4 wherein fine adjusting means that the baud rates can be adjusted in steps; wherein the baud-rate step size ratio (Delta_B_ratio) is defined as the relative increase of baud-rate from one baud-rate to the next: Delta_B_ratio=B_1/B_0; wherein the baud-rate step size ratio Delta_B_ratio is equal or smaller than 10% of the baud rate.

What is claimed is:

1. An apparatus enabled to selectively choose a baud rate for communication of coherent optical data, the apparatus comprising:
   a modem coupled to an optical link to operate with a coherent optical signal modulated at a plurality of baud rates, wherein the modem contains logic enabled to:
   adjust a baud rate from the plurality of baud rates to a selected baud rate based on a modulation format and an available passband of the optical link.

2. The apparatus of claim 1, wherein the selected baud rate is adjusted to meet a smallest available passband on the optical link.

3. The apparatus of claim 1, wherein the modem further comprises logic enabled to:
   measure a difference between an incoming baud rate to the modem and an outgoing sample rate of a digital-to-analog converter or an analog-to-digital converter; and
   change a digital-to-analog converter or an analog-to-digital converter sample rate to the selected baud rate.

4. The apparatus of claim 1, wherein the modem comprises a digital signal processor, wherein the digital signal processor is configured to interpolate digital data samples received by the modem from a first sample rate to a second sample rate.

5. The apparatus of claim 4, wherein the second sample rate accommodates to a sampling rate of a digital-to-analog converter, wherein the sampling rate of the digital-to-analog converter is fixed.

6. The apparatus of claim 4, wherein the first sample rate accommodates to a sampling rate of an analog-to-digital converter, wherein the sampling rate of the analog-to-digital converter is fixed, wherein the second sample rate is a target sampling rate that is different from the first sample rate.

7. The apparatus of claim 4, wherein an interpolation of the digital signal processor employs a numerically-controlled oscillator.

8. The apparatus of claim 1, wherein the modem comprises a clock, wherein a speed of the clock of an analog-to-digital converter or a digital-to-analog converter is changed to match a sampling rate.

9. The apparatus of claim 4, wherein the digital signal processor comprises an interpolator and a numerically controlled oscillator, wherein the numerically controlled oscillator provides the interpolator with sampling timing to create output samples based on the sampling timing.

10. The apparatus of claim 9, wherein the output samples are used to drive a digital-to-analog converter.

11. The apparatus of claim 9, wherein input samples are received from an analog-to-digital converter.

12. The apparatus of claim 1, wherein adjusting the baud rate is based on a selected quadrature amplitude modulation rate comprising a combination of different integer based quadrature amplitude modulation formats.

13. The apparatus of claim 1, wherein the modem is enabled to switch between different quadrature amplitude modulation encoding formats, and wherein the baud rate is changed when switching from one quadrature amplitude modulation encoding format to a different quadrature amplitude modulation encoding format.

14. A method to selectively choose a baud rate for communication of coherent optical data, the method comprising:

determining, by a modem, a modulation format of optical data on an optical link;
determining, by the modem, an available passband of the optical link; and
adjusting, by the modem, a baud rate from a plurality of baud rates to a selected baud rate based on the modulation format and the available passband of the optical link.

15. The method of claim 14, wherein the selected baud rate is adjusted to meet a smallest available passband on the optical link.

16. The method of claim 14, further comprising:
measuring, by the modem, a difference between an incoming baud rate to the modem and an outgoing sample rate of a digital-to-analog converter or an analog-to-digital converter; and
changing, by the modem, a digital-to-analog converter or an analog-to-digital converter sample rate to the selected baud rate.

17. The method of claim 14, wherein adjusting the baud rate is based on a selected quadrature amplitude modulation rate, wherein the selected quadrature amplitude modulation rate comprises a combination of different integer based quadrature amplitude modulation formats.

18. The method of claim 14, further comprising:
switching between different quadrature amplitude modulation encoding formats, wherein the baud rate is changed when switching from one quadrature amplitude modulation encoding format to a different quadrature amplitude modulation encoding format.

19. The method of claim 14, further comprising:
interpolating, by a digital signal processor, digital data samples received by the modem from a first sample rate to a second sample rate.

20. The method of claim 19, wherein the first sample rate accommodates to a sampling rate of an analog-to-digital converter, wherein the sampling rate of the analog-to-digital converter is fixed, wherein the second sample rate is a target sampling rate that is different from the first sample rate.

* * * * *